United States Patent [19]
Walker et al.

[11] Patent Number: 6,119,093
[45] Date of Patent: Sep. 12, 2000

[54] SYSTEM FOR SYNDICATION OF INSURANCE

[75] Inventors: Jay S. Walker, Ridgefield; Thomas M. Sparico, Riverside, both of Conn.

[73] Assignee: Walker Asset Management Limited Partnership, Stamford, Conn.

[21] Appl. No.: 08/886,256

[22] Filed: Jul. 1, 1997

[51] Int. Cl.[7] .................................................. G06F 17/60
[52] U.S. Cl. .................................. 705/4; 705/35; 705/37
[58] Field of Search ................................... 705/4, 35, 36, 705/37, 38, 39

[56] References Cited

U.S. PATENT DOCUMENTS

| | | | |
|---|---|---|---|
| 4,839,804 | 6/1989 | Roberts et al. | 705/36 |
| 4,903,201 | 2/1990 | Wagner | 705/37 |
| 5,025,138 | 6/1991 | Cuervo | 705/38 |
| 5,126,936 | 6/1992 | Champion et al. | 705/36 |
| 5,347,580 | 9/1994 | Molva et al. | 380/25 |
| 5,523,942 | 6/1996 | Tyler et al. | 705/4 |
| 5,704,045 | 12/1997 | King | 705/35 |

OTHER PUBLICATIONS

Smith et al.; "Bond Market Innovations and Financial Intermediation"; *Business Horizons;* v32 n6; p. 24(10); Nov.–Dec. 1989; Dialog: File 148, Acc# 04165262.

"American Exchanges Innovate to Regain Market Share"; *Euromoney;* pp. 90–92; Jun. 1993; Dialog: File 15, Acc# 00730149.

Howard; "London Moving Closer to an Electronic Marketplace"; *National Underwriter (Property/Casualty/Employee Benefits)*; v97 n30; pp. 3, 11; Jul. 26, 1993; Dialog: File 15, Acc# 00740753.

Schwimmer; "US Securities Firms Ready for Opening of Lloyds of London"; *Investment Dealers Digest;* v59 n37; pp. 23–24; Sep. 13, 1993; Dialog: File 15, Acc# 00762177.

Cox et al.; "Insurance Futures and Hedging Insurance Price Risk"; *Journal of Risk and Insurance;* v59 n4; p628917); Dec. 1992; Dialog: File 148, Acc#06222743.

Klecka; "Understanding Financial Futures"; *TMA Journal;* v 14 n4; pp. 49–53; Jul./Aug. 1994; Dialog: File 15, Acc# 00904531.

*Primary Examiner*—Stephen R. Tkacs
*Attorney, Agent, or Firm*—Dean Alderucci; Steven M. Santisi

[57] ABSTRACT

A system is described for facilitating a syndicated sale of an insurance policy. The system employs a processor and a storage device connected to the processor, and a data receiving device and data output device connected to the processor. The processor executes a program to receive information relating to the insurance policy, and to transmit for electronic viewing by a potential buyer an invitation to offer to buy a share in the underwriting of the insurance policy. The share has associated therewith a risk cost assessable to the buyer if payment is made on a claim under the insurance policy. The processor receives offers to underwrite the share of the insurance policy; each offer includes information identifying collateral against which the risk cost may be charged in the event of payment on a claim. The transmission of the invitation and the offer to buy a share may advantageously be made on the Internet.

18 Claims, 25 Drawing Sheets

POLICY DATABASE 320

| POLICY NUMBER 327 | POLICY HOLDER ID NUMBER 311 | TYPE OF COVERAGE 321 | EXTENT OF COVERAGE (X 1,000) 322 | ANNUAL PREMIUM 323 | RESTRICTIONS/ FEATURES 324 | COVERAGE START DATE/END DATE 325 | PAYMENT PLAN 326 | CLAIMS PENDING 328 |
|---|---|---|---|---|---|---|---|---|
| 365BZ | 4234 | AUTO | $300 | $7,000 | FULL | 3/1/97-3/1/98 | MONTHLY | 0 |
| 876CB | 4235 | KIDNAP/ HOMICIDE | $100 | $5,000 | AUTOPSY REQUIRED | 3/1/97-3/1/00 | MONTHLY | 0 |
| 436TS | 4235 | LIFE | $1000 | $10,000 | INVALIDATED BY SUICIDE | 2/26/97- | MONTHLY | 1 |
| 4012TQ | 4235 | NATURAL DISASTER | $10 | $500 | ALL FORMS OF NATURE | 1/1/97-1/1/07 | ANNUAL | 0 |
| 4589ZY | 4236 | HURRICANE | $50 | $2,400 | NONE | 3/10/97-3/10/98 | MONTHLY | 1 |
| 5632LM | 4237 | EARTHQUAKE | $80 | $3,000 | MUST BE ABOVE A 7.0 | 5/6/96-7/6/98 | MONTHLY | 0 |

FIG. 3b

SYNDICATION (BY POLICY) DATABASE 330

| POLICY NUMBER 327 | RISK ASSUMED IN SYNDICATION 331 | CURRENT OUTSTANDING TO UNDERWRITER 332 | PREMIUMS RECEIVED TO DATE 333 | PREMIUMS TO BE PAID 334 | NUMBER OF INVESTORS IN SYNDICATE 335 | EXPIRATION DATE 336 | CLAIMS PENDING 328 |
|---|---|---|---|---|---|---|---|
| 365BZ | $270,000 | $30,000 | 0 | FULL | 9,000 | 3/1/98 | 0 |
| 436TS | $900,000 | $100,000 | 0 | FULL | 450 | | 0 |
| 45892Y | $50,000 | 0 | 0 | FULL | 3,625 | 3/10/98 | 1 |
| 4012TQ | $5,000 | $5,000 | 0 | FULL | 15,000 | 1/1/07 | 0 |
| 876CB | $75,000 | $25,000 | 0 | FULL | 2,500 | 3/1/00 | 0 |
| 5632LM | $20,000 | $20,000 | 0 | FULL | 500 | 7/6/98 | 0 |

FIG. 3c

INVESTOR (BY POLICY) DATABASE 340

| POLICY NUMBER 327 | INVESTOR ID NUMBER 341 | RISK ASSUMED (NUMBER) 342 | RISK ASSUMED (%) 343 | PREMIUM RECEIVED NUMBER 344 | PREMIUM RECEIVED (%) 345 | CREDIT CARD NUMBER 346 | CREDIT CARD TYPE 347 |
|---|---|---|---|---|---|---|---|
| 365BZ | 1234 | $3,000.00 | 1% | $20.00 | 1% | 4028 6041 4231 9876 | VISA |
| 365BZ | 2345 | $3,000.00 | 1% | $20.00 | 1% | 4028 6321 9846 4382 | VISA |
| 365BZ | 3456 | $3,000.00 | 1% | $20.00 | 1% | 6141 3210 9765 4284 | AMEX |

| AMOUNT OF CREDIT FROZEN 348 | LENGTH OF FREEZE 349 | CREDIT CARD ISSUING BANK 351 |
|---|---|---|
| $3,000.00 | 12 MOS. 3/1/98 | CITIBANK |
| $3,000.00 | 36 MOS. 2/26/00 | FLEET |
| $3,000.00 | 36 MOS. 3/1/00 | CHASE |

FIG. 3d

CLAIMS DATABASE 360

| POLICY # 327 | CLAIM # 361 | OFFERED IN SYNDICATION? 362 | # OF INVESTORS IN SYNDICATE 335 | RISK ASSUMED IN SYNDICATION 331 |
|---|---|---|---|---|
| 4589ZY | 123A | YES | 500 | $50,000 |

FIG. 3f

BILLING/PAYMENT DATABASE
380

| POLICY # 327 | NAME 481 | ADDRESS 482 | PHONE NUMBER 483 | E-MAIL ADDRESS 484 | PREMIUMS TO BE PAID 334 | PAYMENT PLAN 326 | CONTRACT LENGTH 349 |
|---|---|---|---|---|---|---|---|
| 4234 | JOE SMITH | 4 GREEN ST. | (203) 721-1289 | GREEN@WEB.COM | $7,000 | MONTHLY | 12 MONTHS |
| 4235 | TOM GLAVINE | 5 BLUE ST. | (203) 637-3165 | BLUE@WEB.COM | $500.00 | ANNUAL | 10 YEARS |
| 4236 | MARK MATHER | 6 RED LN. | (203) 555-5699 | RED@WEB.COM | $2,400 | MONTHLY | 12 MONTHS |

FIG. 3h

INSURANCE SYNDICATION WEBSITE

601 — UNDERWRITER — LLOYD'S OF LONDON

321 — TYPE OF COVERAGE — KIDNAP/HOMICIDE

327 — POLICY NUMBER — 876CB

602 — PERCENTAGE OF SEGMENT FOR SALE — 75%

603 — PREMIUM IN SYNDICATION (MONTHLY) — $417.00

331 — RISK ASSUMED — $100,000.00

605 — RISK PROFILE — LOW

606 — LENGTH OF COVERAGE PERIOD — 36 MOS

607 — REMAINING INVENTORY — 75%

608 — CLICK HERE FOR POLICY DESCRIPTION

609 — LINK TO ORDER FORM

FIG. 6a

INSURANCE SYNDICATION ORDER FORM

— 620

| | |
|---|---|
| 481 — NAME | JOHN Q. INVESTOR |
| 482 — ADDRESS | 111 INVESTMENT DR. |
| | STAMFORD CT |
| | 06905 |
| 483 — PHONE NUMBER | (203) -614-3242 |
| 484 — E-MAIL ADDRESS | INVESTOR@WEB.COM |
| CREDIT CARD TYPE | VISA |
| ISSUING BANK | CITIBANK |
| 485 — CREDIT CARD NUMBER | 4028 6410 9567 3278 |
| EXPIRATION DATE | 3/99 |
| 327 — POLICY NUMBER | 876CB |
| 603 — PREMIUMS (MONTHLY) | $417.00 |
| 343 — RISK ASSUMED | 10% |
| 349 — INVESTMENT TIME PERIOD | 36 MONTHS |
| 621 — | SUBMIT ORDER |

FIG. 6b

CONFIRMATION FORM

630

| | | |
|---|---|---|
| 341 — INVESTOR ID NUMBER | 1234 | |
| 481 — NAME | JOHN Q. INVESTOR | |
| 485a { CREDIT CARD | VISA | |
| NUMBER | 4028 6410 9567 3278 | |
| 327 — POLICY NUMBER | 876CB | |
| 603 — PREMIUM (MONTHLY) | $417.00 | |
| 631 — RISK ASSUMED | $10,000.00 | |
| 374 — AUTHORIZATION NUMBER | 5689076123456 | |
| 349 — LENGTH OF CREDIT FREEZE | 36 MONTHS | |
| 633 — EXPIRATION DATE | 3/1/00 | |

FIG. 6c

MERCHANT DATABASE 740

| MERCHANT ID NUMBER 741 | NAME 742 | ADDRESS 743 | PHONE NUMBER 744 | DESCRIPTION 745 |
|---|---|---|---|---|
| 4002 | WWW. SYNDICATE. COM | 1 CHERRY ST... | (203)-595-8265 | INSURANCE SYNDICATION SERVICE |

TRANSACTION DATABASE 750

| ACCOUNT NUMBER 726 | MERCHANT ID NUMBER 741 | TRANSACTION NUMBER 751 | TRANSACTION TYPE 752 | TRANSACTION AMOUNT 753 | TRANSACTION DATE 754 | TRANSACTION TIME 755 | LENGTH OF CREDIT FREEZE 756 |
|---|---|---|---|---|---|---|---|
| 4028 6410 9567 3278 | 4002 | 5678901231 | CREDIT LINE FREEZE | $10,000.00 | 3/1/97 | 4:34 PM | 36 MONTHS |

SYSTEM FOR SYNDICATION OF INSURANCE

BACKGROUND OF THE INVENTION

This invention relates to systems and methods whereby ad hoc insurance syndicates may be created, particularly ones that are attractive to small investors.

In the usual insurance transaction, a party wishing to protect himself against a risk makes a contract with an insurance underwriter, typically exchanging payments (premiums) for a promise (set forth in an insurance policy) to have the risk covered. Often an individual underwriter does not wish to bear the entire risk; the risk may be shared by forming a insurance syndicate. In an insurance syndicate, a group of individual investors each pledge to insure against a portion of the risk specified in one or more insurance policies, in return for a share of the premiums. The risk to the underwriter is thus distributed among the members of the syndicate; the risk assumed by an individual syndicate member is generally related to the share of the premiums that he receives (in effect, the right to a share of the premiums is representative of the stake in the syndicate owned by that member).

A well-known example of an insurance syndicate is Lloyd's of London, where individual investors (historically called "names") pledge their net worth against the liabilities of specific insurance policies in which they share a portion of the income from premiums and a portion of the risk. Generally, no other security is given by a "name" to offset the risk he assumes when entering a syndicate. Furthermore, in many instances there is no limit on the monetary amount of risk faced by an individual "name." If a loss covered by the insurance syndicate does occur, each "name" is individually responsible for a portion of the loss. Participation in Lloyd's syndicates is thus limited to a relatively few individuals or corporations, who are willing to accept the risks attendant with personal liability. Despite the limited participation and personal liability of "names," default on payment of losses by "names" is a recognized problem with insurance syndicates.

A stake in an insurance syndicate may be sold at an auction to other investors; in exchange for receiving the proceeds from the sale at such an auction, the "name" gives up his premium income while distributing his risk.

On the other hand, a large number of persons hold credit cards with unused credit lines. These unused credit lines potentially could be pledged in making an investment, which would enable the cardholder to realize a source of income from an otherwise untapped personal asset. Such a pledge could be secured against default by freezing a portion of the credit line.

The use of wide area network communications (particularly the Internet) can bring together a large number of people who have shared interests but are geographically scattered. In the case of investing, the Internet can bring together a large number of persons who individually have only a small amount of capital, but collectively control a large amount of capital and are in search of a suitable investment vehicle. The Internet thus has the benefit of aggregating what would otherwise have been unrealized investment demand. In addition, using the Internet makes a wide variety of transactions, including investment transactions, easy and convenient. Furthermore, with the advent of cryptographically secure network communications, an individual may with confidence use an online system to make investment transactions.

Despite these attractive possibilities, no system is known to applicants which utilizes the benefits of the Internet and the credit card system to fill needs in the insurance industry.

U.S. Pat. No. 5,025,138 to Cuervo ("Method and System for Providing Verifiable Credit Line Information") discloses a system whereby the cash surrender value of a life insurance policy is used as collateral for debit card holders. Securing the line of credit through the cash surrender value of the policy eliminates potential losses from default on credit obligations. This system, however, does not utilize the unused credit line of the card holder's account, and does not suggest syndication of the policy.

U.S. Pat. No. 4,839,804 to Roberts et al. ("Method and Apparatus for Insuring the Funding of a Future Liability of Uncertain Cost") discloses a system for reducing the future cost of a liability by projecting an expected death benefit payment and then calculating an annual insurance premium based on that expected benefit, type of policy, and personal and risk characteristics of the insured. This patent also provides for management of the insurer's funds, consisting of premiums and interim cash flow. U.S. Pat. No. 5,126,936 to Champion et al. ("Goal Directed Financial Asset Management System") discloses a system for the management of risk exposure in any asset category. U.S. Pat. No. 5,523,942 to Tyler et al. ("Design Grid for Inputting Insurance and Investment Product Information in a Computer System") discloses a user interface for inputting insurance and investment information into a computer. Also described are methods for calculating behavioral predictions for investments and insurance policies over time based on that information. However, none of these patents discloses a system whereby an individual may purchase a share of an insurance policy offered in syndication by making an online transaction.

Accordingly, there is a need for a more efficient system, preferably implemented on a wide area communication network such as the Internet, whereby a stake in an insurance syndicate may be made widely available as an investment vehicle.

SUMMARY OF THE INVENTION

Our invention provides a system whereby ad hoc insurance syndicates can be created, providing many small investors with an opportunity to collect insurance premiums (or portions of insurance premiums) in exchange for an affordable assumption of risk.

Wide area network communications, such as on the Internet, may be advantageously used by an individual to make a pledge of an unused credit line as collateral for an investment (in particular, the purchase of a share of an insurance policy in syndication).

According to one aspect of our invention, the syndicated sale of an insurance policy is facilitated by an apparatus which includes a processor, a storage device connected thereto, and means for receiving and outputting data. The processor receives policy information relating to the insurance policy, and transmits the policy information for viewing by potential investors. The processor extends invitations to prospective buyers to make offers to purchase shares of the policy in syndication (thereby forming an ad hoc syndicate for that policy). Each share has associated therewith a risk cost, which may be defined as the maximum exposure for the buyer of the share. The risk cost is thus the amount assessable to the buyer if the insurance policy is paid out. The processor also receives the offers to purchase shares of the insurance policy, where each offer includes information identifying a collateral security against which the risk cost may be charged in the event of a payout of the insurance policy.

In addition, the processor may accept an offer and the collateral security identified with the offer. In particular, the collateral security may be a line of credit associated with a credit card account. The processor may communicate with the credit card issuer to determine the available amount of unused credit line, and electronically initiate a credit freeze sufficient to cover the risk cost.

According to another aspect of our invention, an automated method of syndicating the underwriting of an insurance policy comprises the steps of providing electronic data including information relating to the policy, receiving electronic data identifying a buyer of a share of the policy, and initiating the payment of a portion of a premium for the insurance policy to the share buyer (who then becomes an underwriter of the insurance policy). The electronic data identifying the buyer includes an identifier for an account against which a risk cost to the buyer can be charged and an indicator that the account has a portion of credit secured equal in value to the risk cost.

According to a further aspect of our invention, a method for buying a share of an insurance policy comprises the steps of electronically receiving data describing the insurance policy (including a risk cost associated with underwriting a portion of the insurance policy), providing electronically an offer to buy the share of the policy (including identification of a credit card account against which the risk cost may be charged in the event of a payout of the insurance policy), receiving an acceptance of the offer, and receiving a freeze against the credit card account for the risk cost.

Furthermore, the above described method of buying a share of an insurance policy may include the step of receiving at least one payment comprising a portion of the premium of the insurance policy.

As noted above, all of the communications involved in the formation of the ad hoc insurance syndicate may be conveniently performed on the Internet. In particular, confidential information (such as a credit card number and credit line) may be transmitted, and transactions (such as payment of a portion of a premium and a freeze of a portion of a credit line) may be performed, using cryptographically secure communications.

BRIEF DESCRIPTION OF THE DRAWINGS

FIG. 3b shows in tabular form the fields of the policy database of the insurance company server.

FIG. 3c shows in tabular form the fields of the syndication (by policy) database of the insurance company server.

FIG. 3d shows in tabular form the fields of the investor (by policy) database of the insurance company server.

FIG. 3f shows in tabular form the fields of the claims database of the insurance company server.

FIG. 3h shows in tabular form the fields of the billing/payment database of the insurance company server.

FIG. 6a is an illustration of a web page used to post policy information for those policies offered in syndication.

FIG. 6b is an illustration of a web page used to submit orders for syndication of a policy.

FIG. 6c is an illustration of a web page used to confirm an investor's order.

DETAILED DESCRIPTION OF THE PREFERRED EMBODIMENTS

Figure 1:
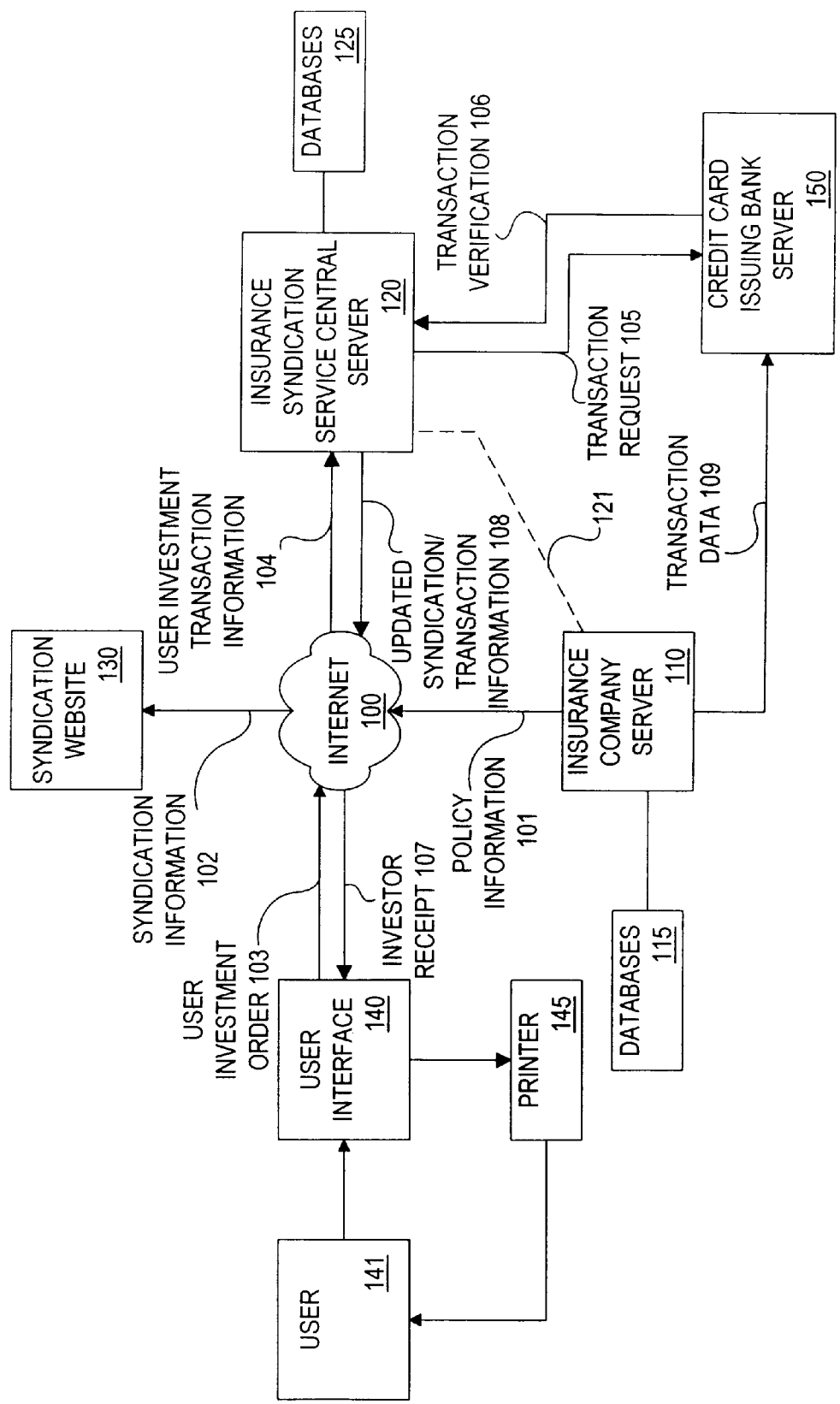
FIG. 1 is a block diagram showing an overview of an insurance syndication system in a preferred embodiment of the present invention.

An overview of a preferred embodiment of the present invention is shown in FIG. 1.

In the system shown in FIG. 1, one or more insurance companies, each having an insurance company server 110, transmits policy information 101 relating to a policy or policies being offered in syndication to an insurance syndication service central server 120. The means for determining whether or not the policies should be offered in syndication is established by each insurance company and is a matter of risk management for the respective companies. The insurance company server transmits the policy information 101 via a network 100 such as the Internet. The syndication service central server 120 makes the policy information 101, together with syndication information 102, available for viewing by visitors to a syndication website 130 (that is, the information is posted on the website).

A user (investor) 141 connects to the insurance syndication website 130 on the Internet 100 through a conventional user interface 140. At the website 130 are listings of all insurance policies which are offered in syndication. The user browses the various policies and picks one or more he is interested in as an investment. Using the conventional interface 140, the user enters his investment order 103; the order includes the policy number, the amount of the policy the user wishes to invest in, the terms of investment (time period, etc.), and other restrictions. The user also enters his credit card number, expiration date and personal information, including his electronic mail ("e-mail") address. He then directs his investment order, including the information he has entered, to be transmitted to the insurance syndication service central server 120 via the Internet.

The syndication central server 120 receives the user investment transaction information 104 including: policy number, amount of policy purchased in syndication, user information, credit card type and number, and expiration date. The syndication central server 120 then processes a credit card transaction, requesting a freeze on a portion of the user's unused credit line for the amount of risk assumed in purchasing the segment of the policy. The credit card transaction request 105 is transmitted to a server 150 maintained by the credit card issuing bank. The credit card company verifies that the user has the requested amount of risk available (in the form of unused credit line) and sends a verification 106 to the syndication central server 120 that the amount has been frozen for the term of the policy investment. (It should be noted that credit line freezes are usually for a maximum of 30 days. If the terms of the investment mandate a longer period, the syndication service must specify the period of time for which the credit line should be frozen or periodically submit a new transaction request extending the freeze.)

The issuing bank then stores the transaction in a conventional manner in a transaction database and updates the cardholder's available credit accordingly to reflect the transaction. If at any time the cardholder cancels his credit card account with that bank, the bank immediately notifies the insurance agency and the terms of policy investment are canceled immediately.

The syndication central server 120, having received the verification 106 of the frozen credit line, stores that information in an appropriate database 125. The syndication central server also transmits a digital receipt 107 to the investor, using the e-mail address provided with the investment order. This receipt is then available to the user (investor) 141 in printed form by using a printer 145.

The syndication central server 120 also transmits to the insurance company server 110 updated syndication and transaction information 108. The insurance company server stores this information in appropriate databases 1 15. The insurance company server uses this information to calculate the amount of premium to be paid to each investor. The appropriate portion of the premium received from the policy holder is sent via mail or electronic transfer to the user (investor) 141 on a periodic basis as established in the terms of the investment.

When a claim is filed on the policy offered in syndication, the insurance company, after determining that the claim is valid, accesses the syndication information in the databases 115 and extracts the appropriate credit line information for all members in the syndicate for that policy. The company then draws on the credit line of each investor's credit card for the appropriate percentage of the amount paid out by the company based on the percentage of the policy owned in syndication. The credit card issuing bank server 150 receives data 109 regarding this transaction from the insurance company server 110 and updates its cardholder records accordingly.

In cases where the investor cancels his card, the credit card issuing bank notifies the syndication service, which subsequently cancels the investor's stake in the policy. The service then notifies the insurance company and the databases 115 and 125 are updated accordingly to reflect the new inventory, premium, and syndication information.

This arrangement described above is preferable when a policy or group of policies is offered by a plurality of insurance companies. The syndication service then functions as a clearinghouse for the various policies offered and various investor orders. Alternatively, the system may be implemented by a single insurance company, in which case the function of the insurance company server 110 and the syndication service central server 120 may be combined. In addition, the insurance company server 110 and the syndication service central server 120 may communicate over a dedicated pathway 121, rather than on the Internet.

In the preferred embodiment of the invention, the user investment transaction information 104, the credit card transaction request 105 and the updated syndication and transaction information 108 are transmitted on the Internet in encrypted form. Accordingly, the insurance company server 110, syndication central server 120 and credit card issuing bank server 150 are provided with a cryptoprocessor, as described in more detail below.

Figure 2:
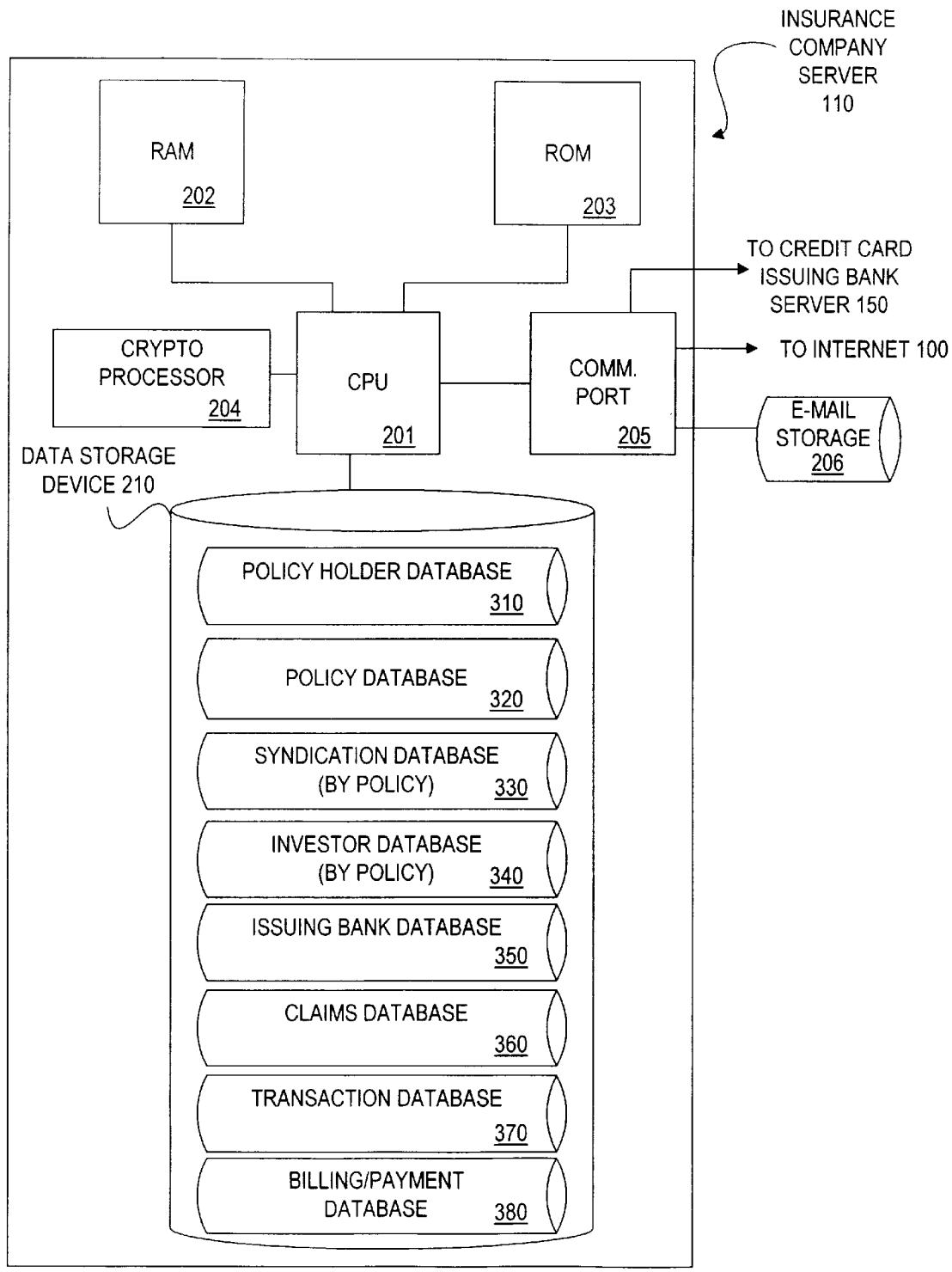
FIG. 2 is a block diagram illustrating the central server of a participating insurance company.

A schematic illustration of the insurance company server 110 is given in FIG. 2. The server has a Central Processing Unit (CPU) 201, to which are connected a Random-Access Memory (RAM) 202, Read-Only Memory (ROM) 203, cryptoprocessor 204, communication port 205 and data storage device 210. The server 110 communicates with the credit card issuing bank server 150 and the Internet 100 through the communication port 205. The communication port 205 is also connected to an e-mail storage device 206. These components of the server are conventional; for example, the central processing unit (CPU) 201 may be a Pentium microprocessor manufactured by Intel, Inc.

The data storage device 210 includes several databases: policy holder database 310, policy database 320, syndication (by policy) database 330, investor (by policy) database 340, issuing bank database 350, claims database 360, transaction database 370 and billing/payment database 380. The information in each of these databases is shown in tabular form in FIGS. 3a–3h, respectively.

Figure 3A:
FIG. 3a shows in tabular form the fields of the policy holder database of the insurance company server.

The policy holders of the insurance company are listed in the policy holder database 310. As shown in FIG. 3a, each policy holder has an ID number 311, associated with which are various items of personal information (name 312, address 313, phone number 314, Social Security number 316 and birthdate 317). The number of active policies 315 held by each policy holder is also listed.

The fields of the policy database 320 are shown in FIG. 3b. Each policy, identified by a policy number 327, has a separate entry which also includes the policy holder ID number 311, the type of coverage 321, the extent of coverage 322, the annual premium 323, restrictions or special features 324, the start/end date of coverage 325, the payment plan 326 for paying premiums, and the number of claims pending 328.

FIG. 3c shows the fields of the syndication (by policy) database 330. This database has a separate entry for each policy in syndication, listing information regarding the syndication status of that policy. An entry includes the policy number 327, the amount of risk 331 assumed in syndication of the policy (that is, the amount that has been offered for syndication, which may or may not be the total amount of coverage), the current amount of risk 332 borne by the underwriter (that is, the insurance company issuing the policy), the number of premium payments made to-date 333, total number of premium payments to be paid during the life of the policy 334, the number of investors in the syndicate 335 (that is, the number of persons who have invested in syndication of that policy), the expiration date 336 of the policy, and the number of claims pending 328.

FIG. 3d shows the fields in the investor (by policy) database 340. In this database, an individual policy may have multiple entries, one for each investor in that policy. An entry thus has the policy ID number 327 and an investor ID number 341. Associated with the ID numbers are the amount of risk 342 under the policy assumed by the investor, the percentage of the risk 343 under the policy assumed by the investor, the amount 344 of the premium on that policy received by the investor from each premium payment, the percentage 345 of the premium received by the investor, the credit card number 346 and credit card type 347 used by the investor in connection with that policy, the amount of credit 348 on the credit card account which has been frozen, the length 349 of the credit freeze (which may or may not correspond to the length of policy coverage, depending on the terms of the investment), and the name of the credit card issuing bank 351.

Figure 3E:
FIG. 3e shows in tabular form the fields of the issuing bank database of the insurance company server.

As shown in FIG. 3e, the issuing bank database 350 contains the information essential for the insurance company server 110 to contact each credit card issuing bank to perform a transaction therewith. An entry in the issuing bank database thus includes the credit card issuing bank name 351 and the contact information 352 for that bank. The contact information could comprise, for example, an electronic address (as shown), a mailing address, telephone number, or the like.

FIG. 3f shows the fields in the claims database 360. Each claim is identified by a claim number 361. Each entry in the claims database also includes the policy number 327 of the policy under which the claim was filed, an indication 362 whether the policy has been offered in syndication, the number 335 of investors in the syndicate for that policy, and the amount of risk 331 assumed in syndication.

Figure 3G:
FIG. 3g shows in tabular form the fields of the transaction database of the insurance company server.

FIG. 3g shows the fields in the transaction database 370. Each transaction is identified by a transaction number 373. Each transaction number has associated therewith the transaction type 371, the transaction amount 372, the investor ID number 341 of the investor whose credit card is involved in the transaction, the credit card number 346, and the authorization number 374 for performing the transaction (assigned by the credit card issuing bank).

FIG. 3h shows the fields in the billing/payment database 380. Each entry corresponds to an investment by a particular investor in a particular policy. The policy is identified by the policy number 327. The investor is identified by name 481. Each investor name has associated therewith a postal mailing address 482, a phone number 483 and an e-mail address 484. Each entry also includes the premiums to be paid 334 to the investor on the policy, the payment plan 326, and the length 349 of the investor's syndication contract relating to the policy.

Figure 4:
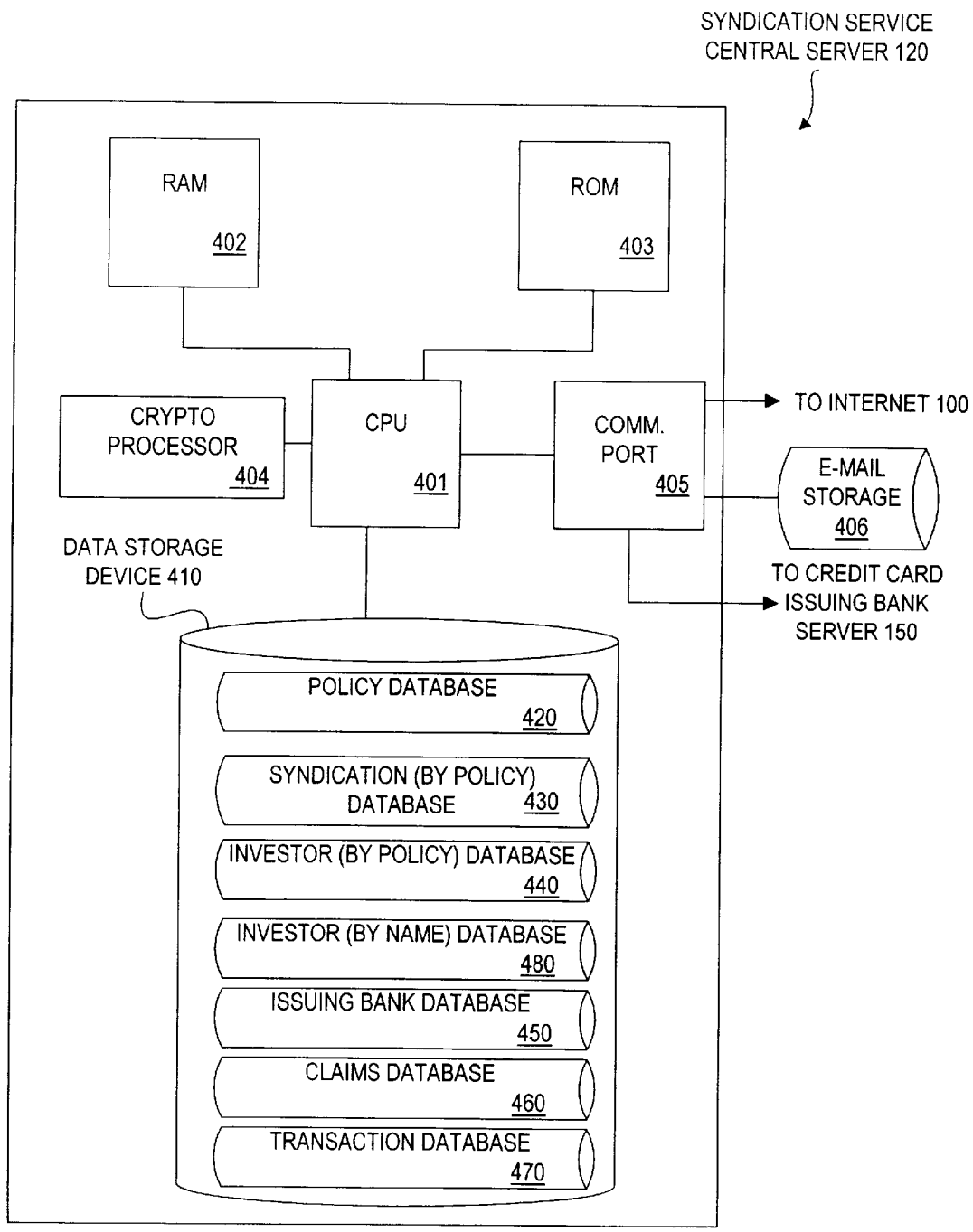
FIG. 4 is a block diagram illustrating the central server of the insurance syndication service.

A schematic illustration of the syndication service central server 120 is given in FIG. 4. The structure of this server is similar to that of the insurance company server 110 described above with reference to FIG. 2. The syndication central server has a CPU 401, to which are connected a RAM 402, ROM 403, cryptoprocessor 404, communication port 405 and data storage device 410. The syndication central server 120 communicates with the credit card issuing bank server 150 and the Internet 100 through the communication port 405. The communication port 405 is also connected to an e-mail storage device 406. The data storage device 410 includes several databases 125: policy database 420, syndication (by policy) database 430, investor (by policy) database 440, investor (by name) database 480, issuing bank database 450, claims database 460 and transaction database 470.

The data in the policy database 420, syndication (by policy) database 430, investor (by policy) database 440, issuing bank database 450, claims database 460 and transaction database 470 of the syndication central server 120 has the same arrangement as the data in the corresponding policy database 320, syndication (by policy) database 330, investor (by policy) database 340, issuing bank database 350, claims database 360 and transaction database 370 of the insurance company server 110. Accordingly, the structure of the policy database 420, syndication (by policy) database 430, investor (by policy) database 440, issuing bank database 450, claims database 460 and transaction database 470 is as already described in FIGS. 3b through 3g, respectively. Where insurance policies having data in server 110 are offered for syndication using server 120, the policy records will be substantially identical in the corresponding databases.

Figure 5:
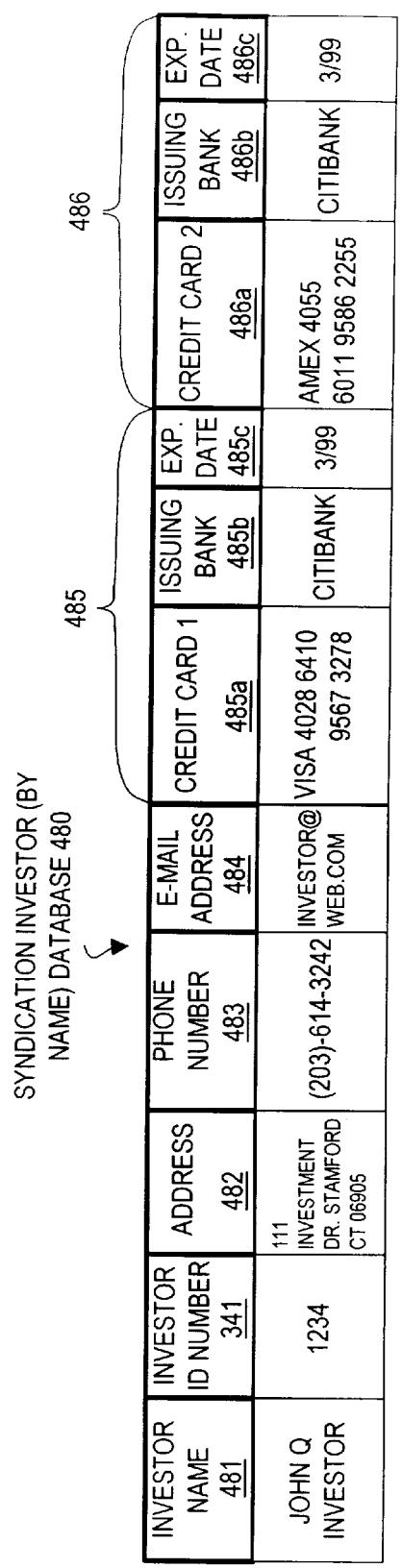
FIG. 5 shows in tabular form the fields of the investor (by name) database of the syndication central server.

FIG. 5 shows the structure of the investor (by name) database 480 of the syndication central server 120. Each investor is identified by name 481 and by ID number 341. Each investor name and ID number has associated therewith a postal mailing address 482, a phone number 483 and an e-mail address 484. Each investor entry also includes a field 485 containing information regarding the credit card used by the investor: the type and number 485a of the credit card, the issuing bank 485b and the expiration date 485c. If the investor has used more than one credit card to place investment orders, additional fields 486, etc. having the same structure as field 485 are included for each of the additional cards.

FIG. 6a shows an example of a posting 600 of policy information 101 with syndication information 102 on the syndication website 130. The posting includes the underwriter name 601, the type of coverage 321 and the policy number 327. Also included is the percentage of the total risk offered for sale in syndication 602, the monthly premium 603, the risk assumed in syndication 331, a statement of the level of risk (risk profile 605), the length of the coverage period 606 and the remaining percentage of the total risk available for sale (remaining inventory 607). The monthly premium 603 and length of coverage period 606 can be calculated from the annual premium 323 and start/end date of coverage 325. The user 141 can view a more complete description of the policy by clicking box 608, or proceed to place an investment order by clicking box 609.

FIG. 6b is an example of a web page 620 filled in by a user (investor) 141 to submit an order for a syndicated portion of a policy. The investor enters his name 481, postal mailing address 482, phone number 483, e-mail address 484 and credit card information 485 (including the credit card type and number, issuing bank and expiration date) on the order form. This information is added to the investor (by name) database 480 of the syndication central server. The policy number 327 and monthly premium 603 are copied from the display 600 of the policy information. The investor indicates the percentage 343 of the total risk 331 he wishes to assume and the length of time for which he wishes to invest (length of credit freeze 349), and then clicks box 621 to submit his investment order.

FIG. 6c is an illustration of a web page which serves as a confirmation 630 of an investor's order. The confirmation form may include the investor ID number 341 assigned by the syndication service, the investor's name 481, the investor's credit card type and number 485a, the policy number 327, the monthly premium 603, the amount of risk 631 assumed by the investor (that is, the total amount of risk in syndication 331 multiplied by the percentage 343 assumed by the investor), the authorization number 374 for the corresponding credit freeze placed on the credit card, the length of the credit freeze 349 and the expiration date 633 of the credit freeze.

Figure 7:
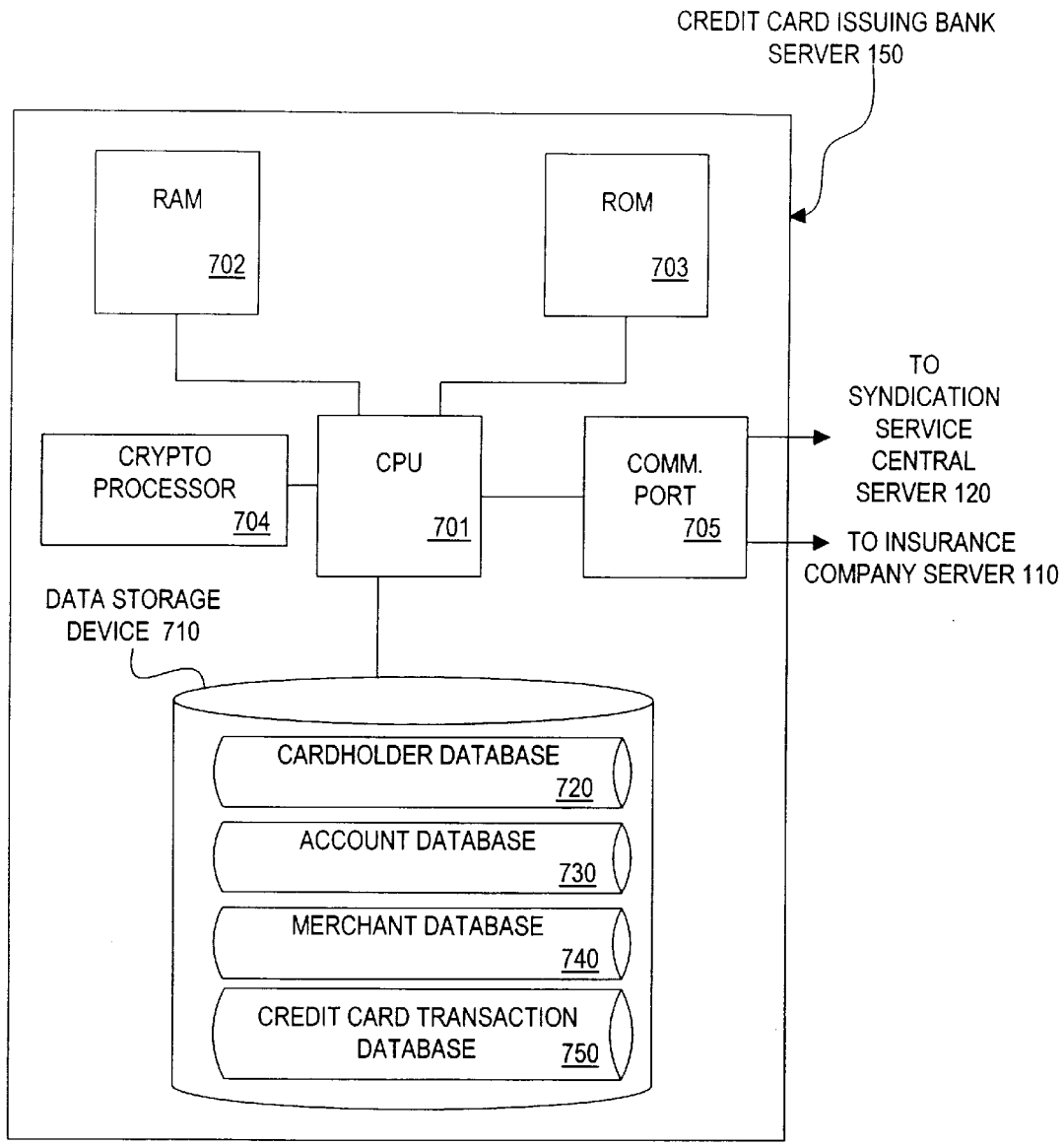
FIG. 7 is a block diagram illustrating the credit card issuing bank server.

The structure of the credit card issuing bank server 150 is illustrated schematically in FIG. 7. This server has a CPU 701 and RAM 702, ROM 703, cryptoprocessor 704 and communication port 705 connected thereto, similar to the corresponding components of the insurance company server 110 and the syndication central server 120. The credit card issuing bank server communicates with the insurance company server 110 and the syndication central server 120 through communication port 705. The credit card issuing bank server also includes a data storage device 710 connected to the CPU 701. The data storage device 710 includes cardholder database 720, account database 730, merchant database 740 and credit card transaction database 750. The structure of each of these databases is shown in tabular form in FIGS. 8a–8d respectively.

Figure 8A:
FIG. 8a shows in tabular form the fields of the cardholder database of the credit card issuing bank server.

FIG. 8a shows the fields of the cardholder database 720. Each entry of the database includes the cardholder's name 721, address 722, phone number 723, date of birth 724, Social Security number 725, and the credit card account number 726.

Figure 8B:
FIG. 8b shows in tabular form the fields of the account database of the credit card issuing bank server.

FIG. 8b shows the fields of the account database 730. In this database, each account is identified by account number 726. Each account number has associated therewith a credit limit 731, a cash advance limit 732, a frozen amount 733 of the credit line, and an account balance 734.

Figures 8C, 8D:
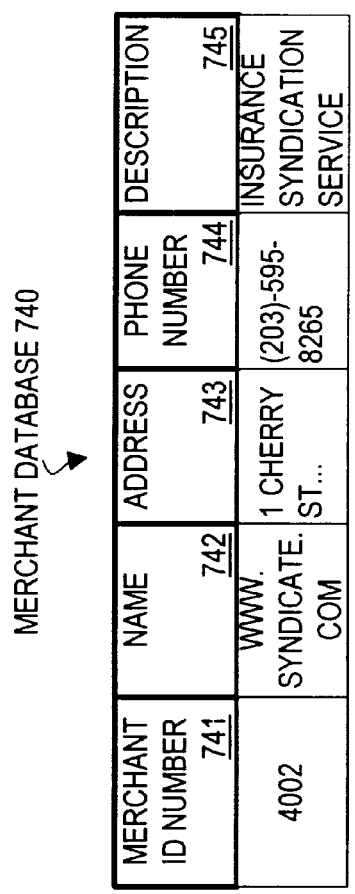
FIG. 8c shows in tabular form the fields of the merchant database of the credit card issuing bank server.
FIG. 8d shows in tabular form the fields of the transaction database of the credit card issuing bank server.

FIG. 8c shows the fields of the merchant database 740 of the credit card issuing bank server. Each entry of the merchant database contains information regarding a particular merchant. The merchant is identified by an ID number 741 and by a name 742. The database also includes the address 743 and phone number 744 of the merchant, and a brief description 745 of the type of business conducted by the merchant. (In the present embodiment, the credit card issuing bank views the syndication service as a merchant and the investor as that merchant's customer.)

The fields of the credit card transaction database 750 are shown in FIG. 8d. The database includes the account number 726 of the credit card used in the transaction, the merchant ID number 741, the transaction number 751, the transaction type 752, transaction amount 753, transaction date 754, transaction time 755, and the length of time 756 for which the credit freeze is effective (as determined by the terms of the investment). The example shown in the figure is of a credit line freeze performed when an investor places an order with the syndication service.

In the practice of this invention, cryptographic processing of the transmissions to and from the user 141, and among the various servers 110, 120 and 150, is highly desirable for at least two reasons: (1) The user desires assurance that personal information (for example, his credit card number and the amount of available credit) be kept confidential; otherwise, the investment opportunity will appear much less attractive, and (2) once the investor receives confirmation that he has assumed a portion of a risk with respect to a policy, he should not be able to deny that he accepted the risk when faced with a claim under the policy; accordingly, the system requires that his investment order be authenticatable and non-repudiable.

The cryptoprocessors 204, 404 and 704 can be general purpose processors (e.g., Intel CPU) receiving instructions from RAM 202, 402 and 702 or ROM 203, 403 and 703. Alternatively, they may be special purpose processors optimized for performing cryptographic operations (e.g., National Semiconductor iPower SPU). That is, the cryptoprocessors may comprise any hardware or software engine capable of performing cryptographic operations on a given quantity. As described in greater detail below, such operations may include both keyless and keyed operations, as well as various combinations thereof.

The degree of cryptographic processing depends on the degree of security that is desired. For example, where the primary concern is integrity of the investment amount, a simple one-way algorithm, e.g. a hash, message authenticity code (MAC), or cyclic redundancy check (CRC), applied to the amount, might be adequate. Alternatively, a unique device identification number, stored in ROM or RAM of server 110, 120 or 150, can be added to the hash to provide assurance of device authenticity.

As used herein, a one-way function is one that outputs a unique representation of an input such that a given output is likely only to have come from its corresponding input, and such that the input can not be readily deduced from the output. Thus, the term one-way function includes hashes, message authenticity codes (MACs—keyed one-way functions), cyclic redundancy checks (CRCs), and other techniques that are well known to those skilled in the art. See, for example, Bruce Schneier, "Applied Cryptography" (2d ed. 1996). As a matter of convenience, the term "hash" will be understood to represent any of the aforementioned or other one-way functions throughout this discussion. Typically, the hash would be performed by the cryptoprocessor using a hardwired hashing algorithm or one stored in ROM or RAM. The hash may either be a keyed or keyless operation. Normally, one-way hash functions do not require a private key.

If a private key is employed by the cryptoprocessor to encrypt a transmission to another server, it may be stored in the ROM and read by the cryptoprocessor at the time of encryption. In addition, the private key stored in the ROM of a server may be specific to that server, to authenticate use of the particular server as well as to authenticate the transmission therefrom. Even greater assurance can be provided by adding unique device IDs, witness IDs, challenge-response protocols, digital certificates, combinations of symmetric and asymmetric (public key) encryption, and many other cryptographic techniques, in patterns appropriate to the particular application at hand. In particular, digital signatures may be used to insure non-repudiation of acceptance of a risk associated with a given policy.

The operation of the system of the present invention according to the preferred embodiment is detailed in the flowcharts shown in FIGS. 9–14.

Figure 9:
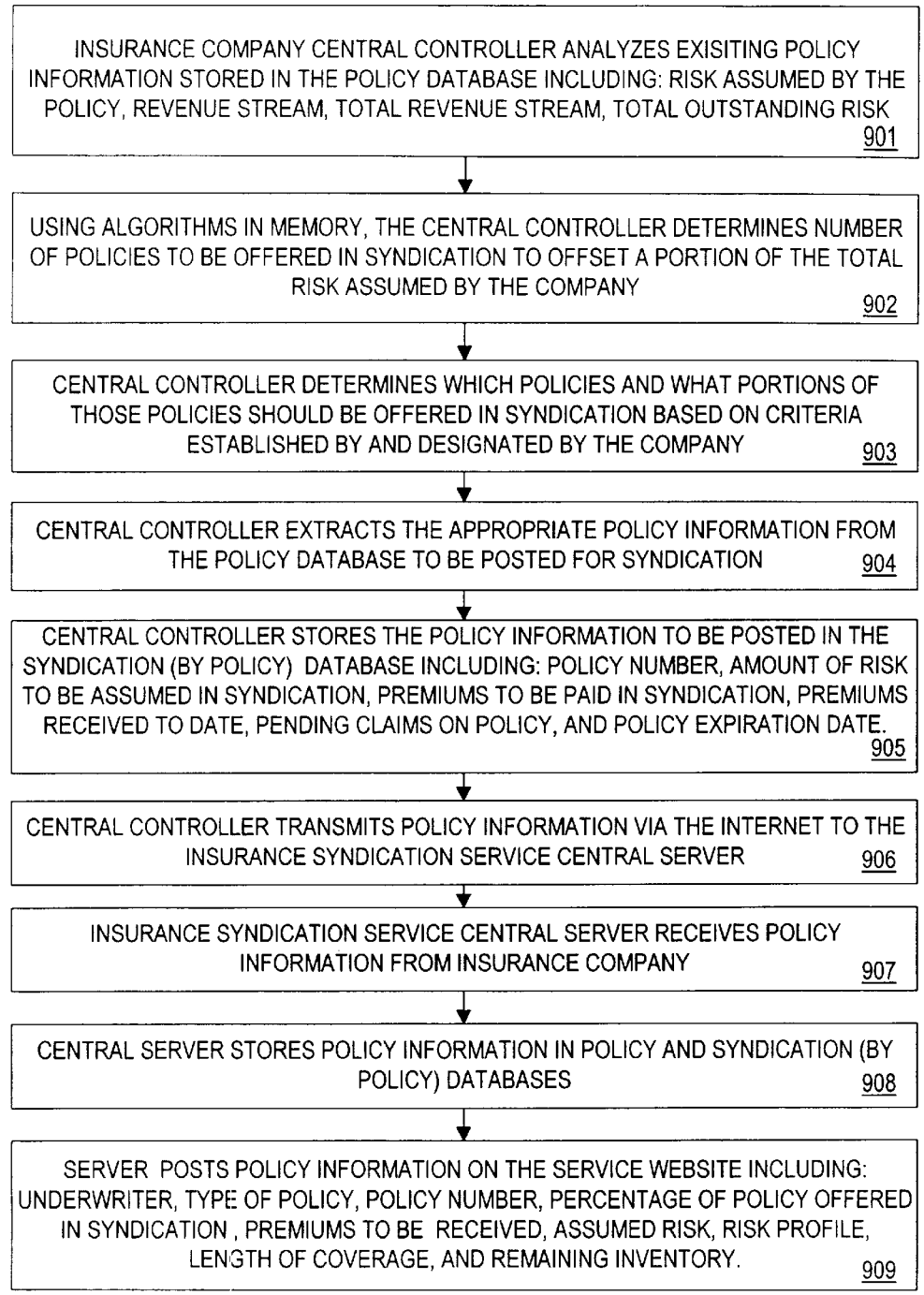
FIG. 9 is a flowchart describing the process by which an insurance policy is offered in syndication by posting on the syndication website.

FIG. 9 shows the process by which a policy is offered in syndication by posting on the syndication website 130. The insurance company reviews the policies it has issued to determine which policies should be offered in syndication, and transmits information regarding those policies to the syndication service for posting on the website. Specifically, the central controller 201 of the insurance company server 110 analyzes existing policy information stored in the policy database 320 (step 901). Some of the factors which may be considered include: the risk assumed by the policy, the revenue stream (premiums to be received) for the policy, the total revenue stream, and the total outstanding risk.

The insurance company uses algorithms to offset its total outstanding risk by some predetermined percentage, so as to avoid underwriting so much risk that the company would suffer serious financial harm if a large number of policies were claimed. These algorithms are based on the risk profile for the company and the company's financial situation and stored in memory (for example, in ROM 203). Using these algorithms, the central controller 201 determines the number of policies that should be offered in syndication to offset a portion of the total risk assumed by the company (step 902). The central controller then determines which policies and/or portions of policies should be offered in syndication, based on the criteria established by the company (step 903).

The central controller 201 extracts the appropriate policy information 101 from the policy database 320 to be posted for syndication on the website 130 (step 904). The central controller stores the policy information to be posted in the syndication (by policy) database 330 (step 905). This policy information may include: the policy number 327, the amount of risk to be assumed in syndication 331, the premiums to be paid in syndication 334, premiums received to date 333, the number of pending claims 328, and the policy expiration date 336.

The central controller then transmits the policy information 101 via the Internet 100 to the insurance syndication service central server 120 (step 906). The syndication central server 120 receives the policy information (step 907) and stores the policy information in the policy database 420 and the syndication (by policy) database 430 (step 908).

The syndication central server 120 then posts the policy information on the syndication website 130 (step 909). As discussed above with reference to FIG. 6a, the posted information may include: the underwriter name 601, the type of policy 321, the policy number 327, the percentage of the policy offered in syndication 602, premiums to be received 603, the assumed risk 604, risk profile 605, the length of coverage 606, and the remaining inventory 607.

Figure 10:
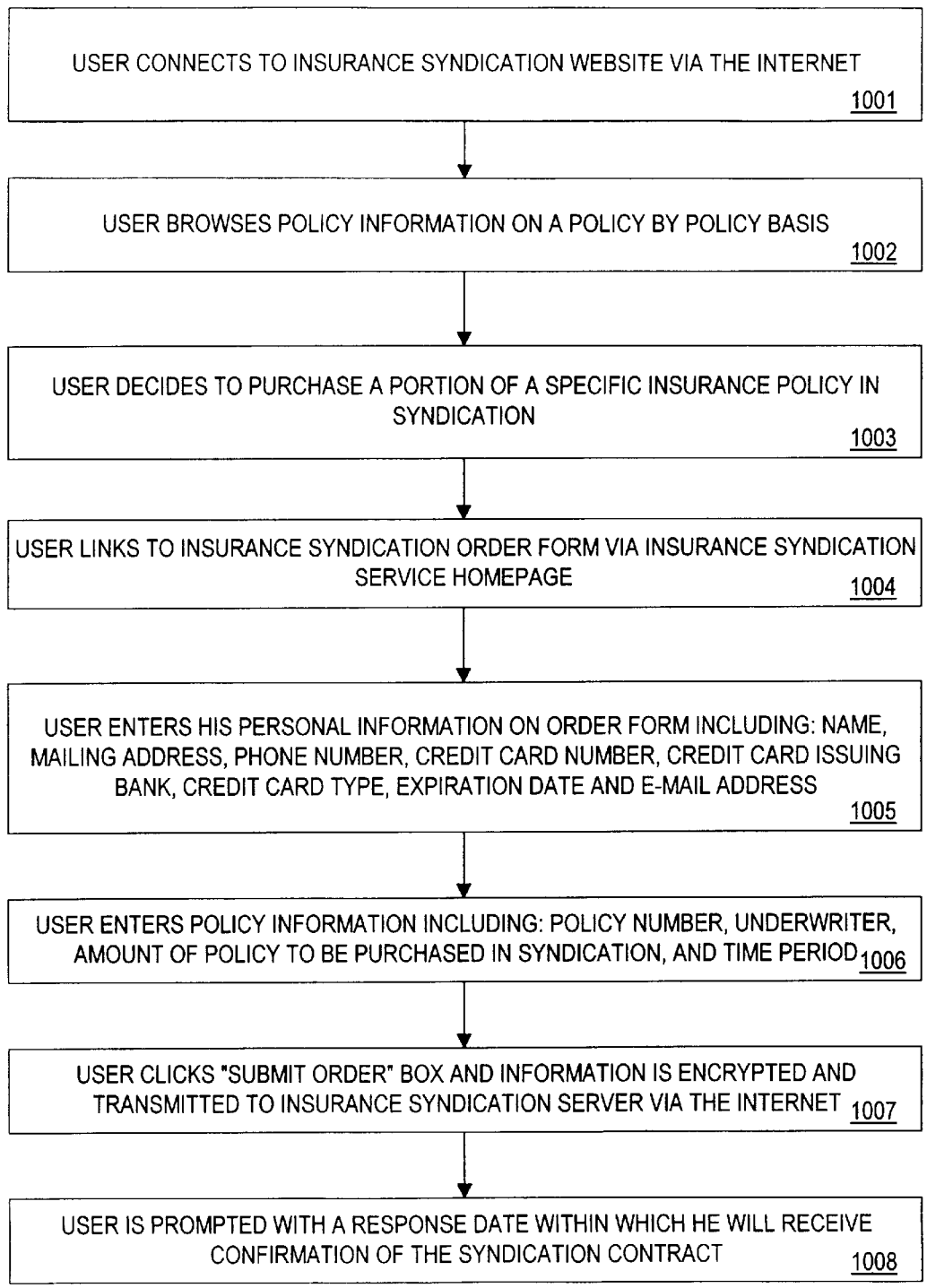
FIG. 10 is a flowchart describing the process by which an investor visiting the syndication website initiates a purchase of a portion of an insurance policy offered in syndication.

The process by which a user 141 visiting the insurance syndication website 130 places an investment order 103 is shown in FIG. 10. In step 1001, the user connects to the website via the Internet 100. In step 1002, the user browses the policy information on a policy by policy basis (the information for each policy being displayed as shown in FIG. 6a, for example). The user decides to purchase a portion of a specific insurance policy in syndication (step 1003), and then links to the insurance syndication order form (step 1004) via the insurance syndication service homepage (for example, by clicking on the box 609 appearing with the display 600 of information for that policy).

The user enters his personal information on order form 620 (step 1005). As discussed above with reference to FIG. 6b, this information may include the user's name 481, mailing address 482, phone number 483, credit card type, credit card number, issuing bank and expiration date 485, and e-mail address 484. The user also enters information regarding the policy in which he wishes to invest (step 1006). This information may include the policy number 327, the portion 343 of the risk he assumes in syndication, and the length of time for which he wishes to invest (that is, the duration of the credit freeze 349). The user then clicks the "submit order" box 621 (step 1007) which causes the information to be encrypted and transmitted to the syndication central server 120 via the Internet. Finally (step 1008), the user (investor) is prompted with a response date within which he will receive confirmation of the syndication contract. Alternatively, if credit can be verified in real time, an immediate confirmation will be provided.

Figure 11A:
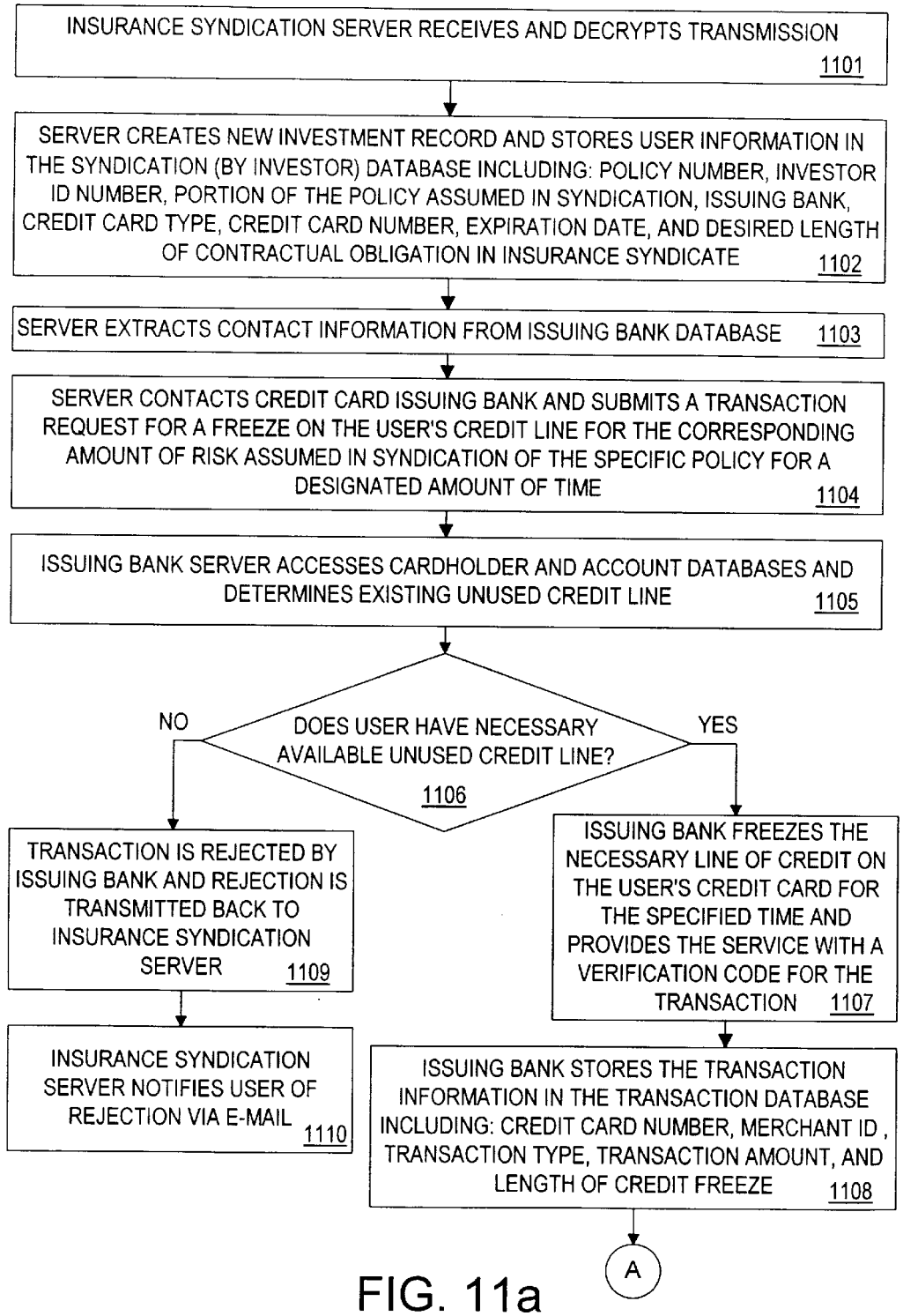
FIGS. 11a and 11b are connected flowcharts describing the process by which the insurance syndication service central server processes an order placed by an investor.
Figure 11B:
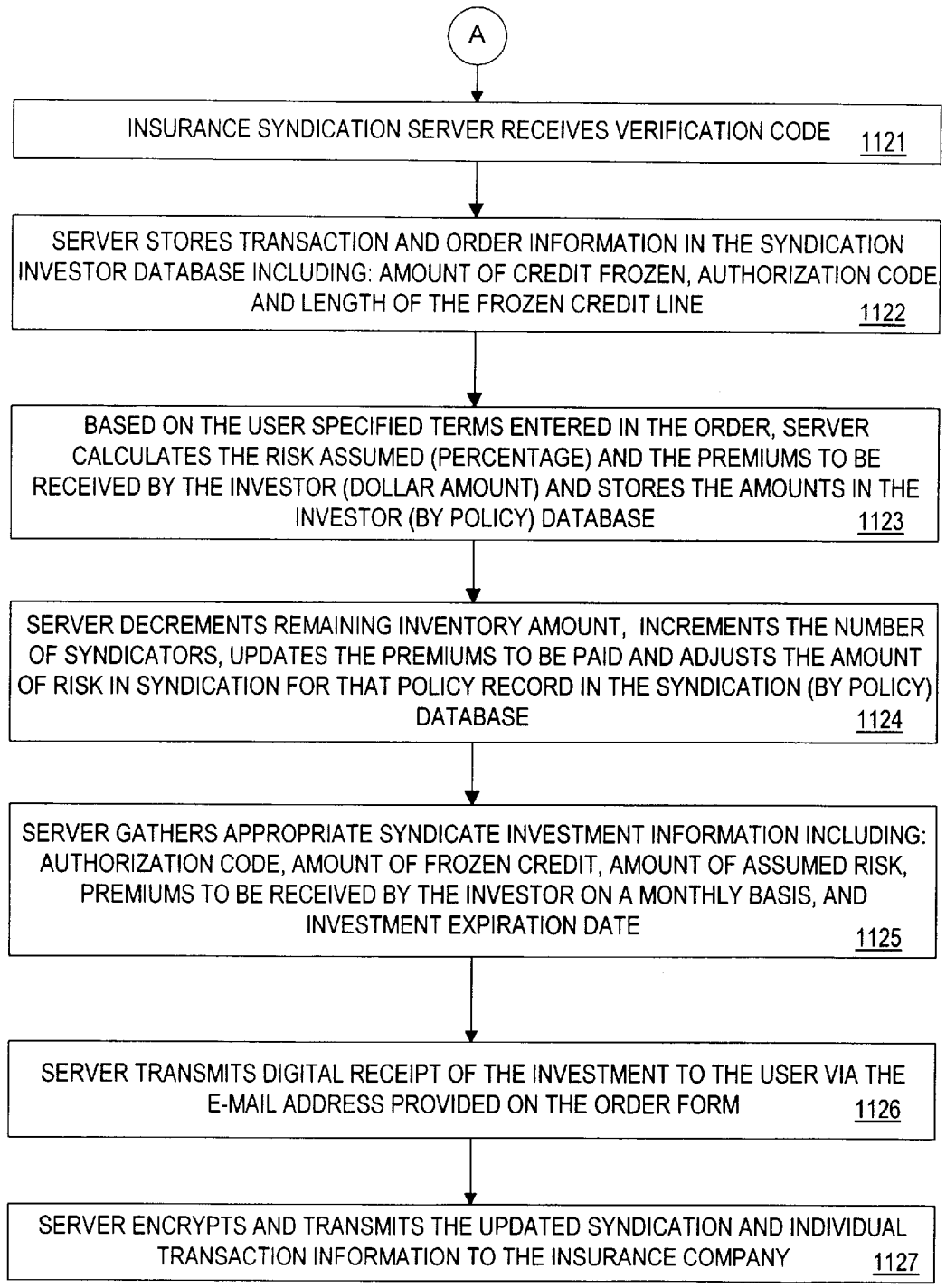

FIGS. 11a and 11b, which are to be read as connected flowcharts, show the steps executed by the syndication central server 120 in processing an investment order 103.

In step 1101, the syndication central server 120 receives and decrypts the transmission from the user 141 (the transmission containing the information sent in step 1007). In step 1102, the server creates a new investment record containing the personal information and investment ordering information entered by the user in steps 1005 and 1006. This record is stored in RAM 402 pending receipt by the server of the verification 106 of the credit freeze transaction.

The syndication central server extracts the contact information 352 from the issuing bank database 450 (step 1103). The server then contacts the credit card issuing bank and submits a transaction request 105, requesting a freeze on the user's credit line for the amount of risk assumed by the user in syndication of the specific policy for the designated amount of time (step 1104).

The credit card issuing bank server 150 accesses the cardholder database 720 and account database 730 and determines the existing unused credit line (step 1105). The server 150 then determines whether the available unused credit line is sufficient to perform the transaction (step 1106). If not (step 1109), the issuing bank server 150 rejects the transaction and so notifies the insurance syndication service central server 120; the syndication central server 120 then notifies the user of the rejection via e-mail (step 1110).

If the user has sufficient available credit (step 1107), the issuing bank server 150 freezes the necessary line of credit on the user's credit card for the specified time and sends the syndication central server 120 a verification 106 for the transaction. The issuing bank server 150 adds a record to the credit card transaction database 750 containing information regarding the credit line freeze transaction, and updates the cardholder's record in the account database 730 to reflect the credit freeze (step 1108).

Upon receiving the verification 106 (step 1121), the syndication central server 120 retrieves the new investment record and stores the information therein in the appropriate databases (step 1122). Specifically, the server 120 creates a new record in the investor (by name) database 480 if the investor is not previously known; the server also adds a record to the investor (by policy) database 440 to reflect the information entered by the investor previously in steps 1005 and 1006, and adds a record to the transaction database 470.

Based on the user-specified terms entered in the investment order, the server calculates the dollar amount of the risk assumed and the dollar amount of the premiums to be received by the investor and stores these amounts in the investor (by policy) database 440 (step 1123).

The server also updates the record in the syndication (by policy) database 430 for the policy (step 1124). Specifically, the server decrements the amount of outstanding risk, increments the number of syndicators, updates the premiums to be paid and increments the amount of risk in syndication.

The server then gathers appropriate investment information (step 1125) to include in the confirmation 630 to be sent to the investor. This information may include the authorization number 374, the amount of assumed risk 631, the amount 603 of premiums to be received by the investor on a monthly basis, and the investment expiration date 633. The server transmits (step 1126) the digital receipt 107 of the investment to the user via the e-mail address provided on the order form. Finally, in step 1127, the syndication central server encrypts and transmits the updated syndication and individual transaction information to the insurance company server 110.

Figure 12:
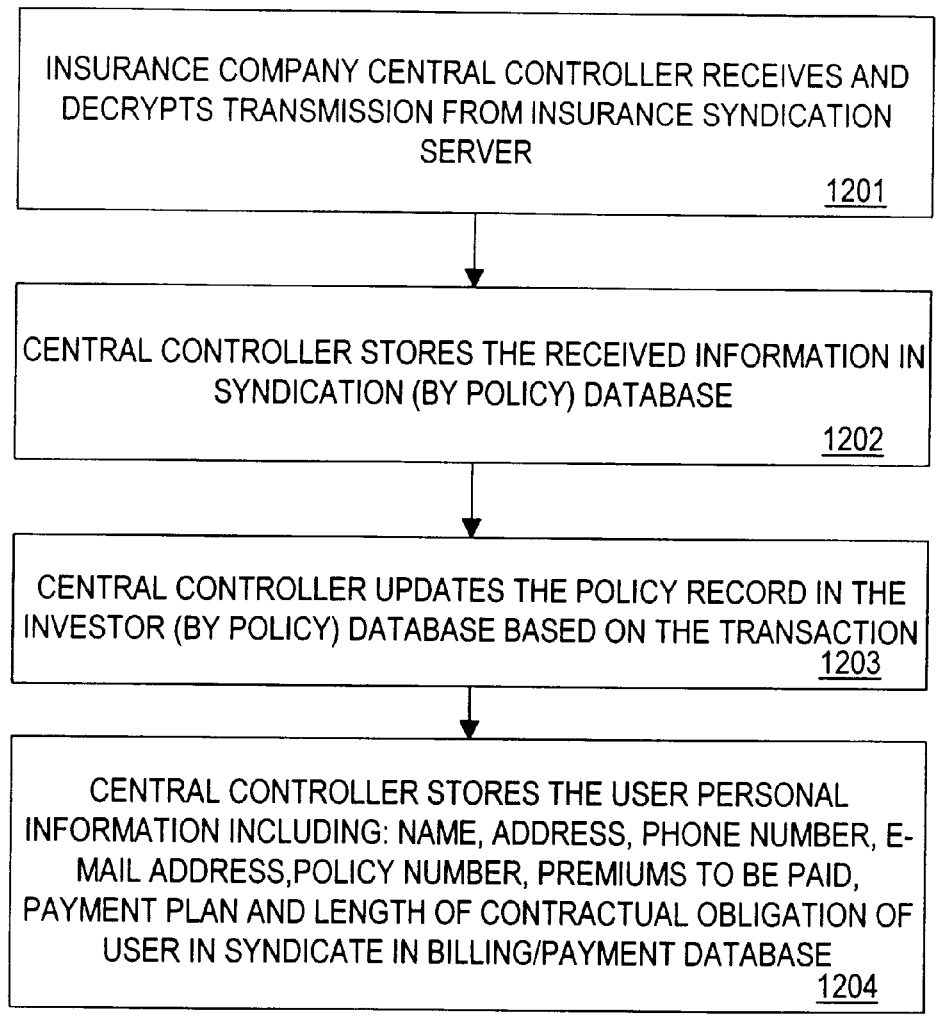
FIG. 12 is a flowchart describing the process executed by the insurance company central server when the syndication central server processes an investment order.

FIG. 12 shows a process executed by the insurance company server 110 when a syndication investment is processed by the syndication central server 120. In step 1201, the insurance company central controller 201 receives and decrypts the transmission from the syndication central server sent in step 1127. The insurance company server then stores the syndication and transaction information in the appropriate databases, mirroring the information stored by the syndication central server 120. Specifically, the insurance company server updates the syndication (by policy) database 330 (step 1202), adds a record to the investor (by policy) database 340 (step 1203), and adds a record to the billing/payment database 380 (step 1204).

Figure 13:
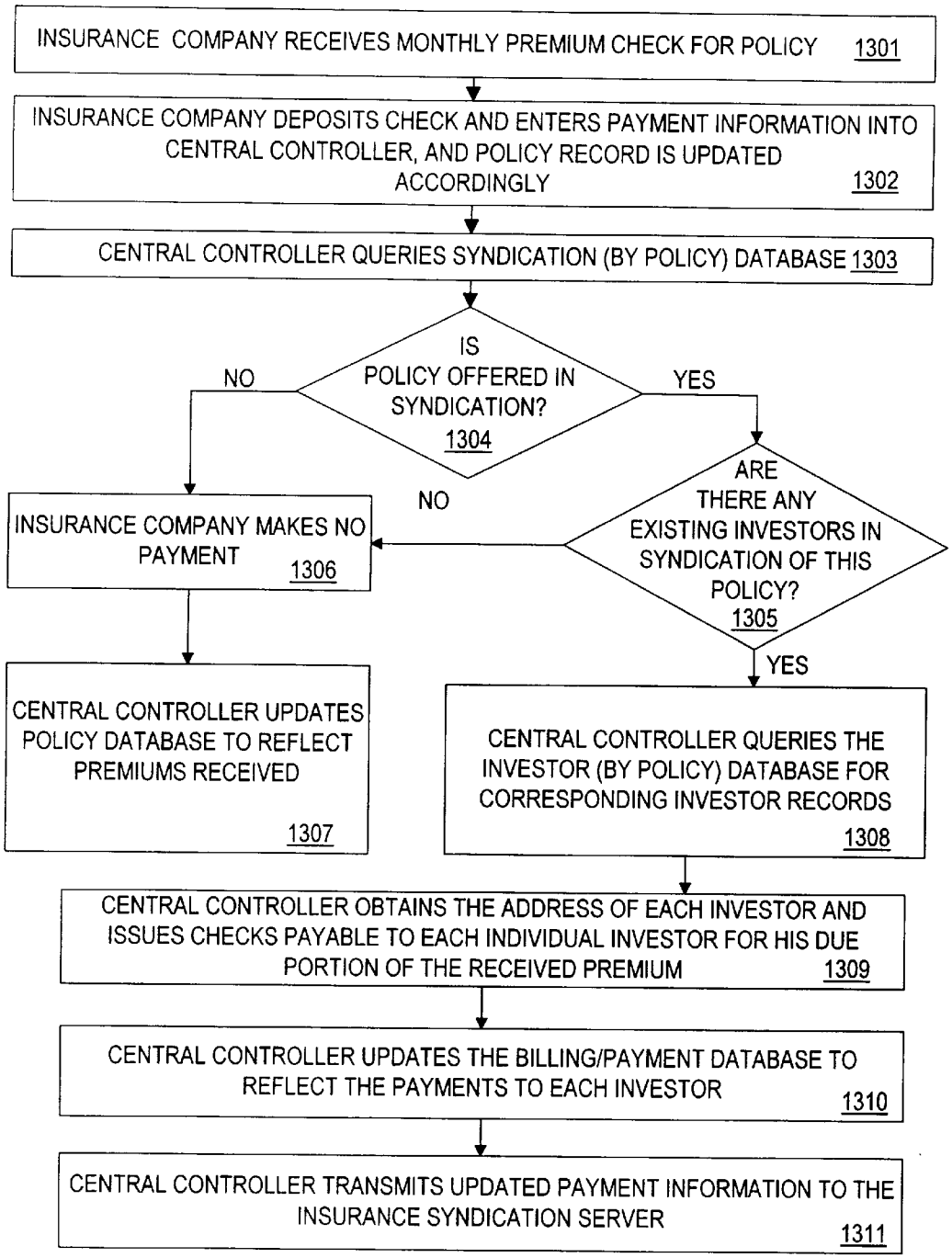
FIG. 13 is a flowchart describing the process by which the insurance company server processes a premium payment for a policy offered in syndication.

FIG. 13 shows the steps executed by the insurance company server 110 in this embodiment when processing premium payments on a policy. In step 1301, the insurance company receives a monthly premium check in a certain policy. The insurance company deposits the check and enters payment information into the central controller 201, which updates the policy database 320 accordingly (step 1302).

The central controller 201 then queries the syndication (by policy) database 330 (step 1303), to determine whether the policy is offered in syndication (step 1304), and if so, whether there are any existing investors in the syndication of the policy (step 1305). If the policy is not in syndication, or if there are no existing investors (step 1306), the insurance company does not make a syndication payment; the central controller 201 updates the policy database 320 to reflect receipt of the premium (step 1307).

If the policy is in syndication with existing investors (that is, there are investors to whom a portion of the premium should be paid), the central controller 201 queries the investor (by policy) database 340 for the corresponding investor identification (step 1308). The insurance company server then obtains the address of each investor to be paid from the investor (by name) database 480 of the syndication central server 120. Alternatively, the insurance company server 110 may maintain an investor database in the storage device 210 that mirrors the investor (by name) database 480. The insurance company central controller then issues checks payable to each individual investor for his due portion of the received premium (step 1309). The insurance company server updates the billing/payment database 380 to reflect the payments made to each investor (step 1310). The insurance company server 110 then transmits updated payment information to the syndication central server 120 (step 1311).

Figure 14:
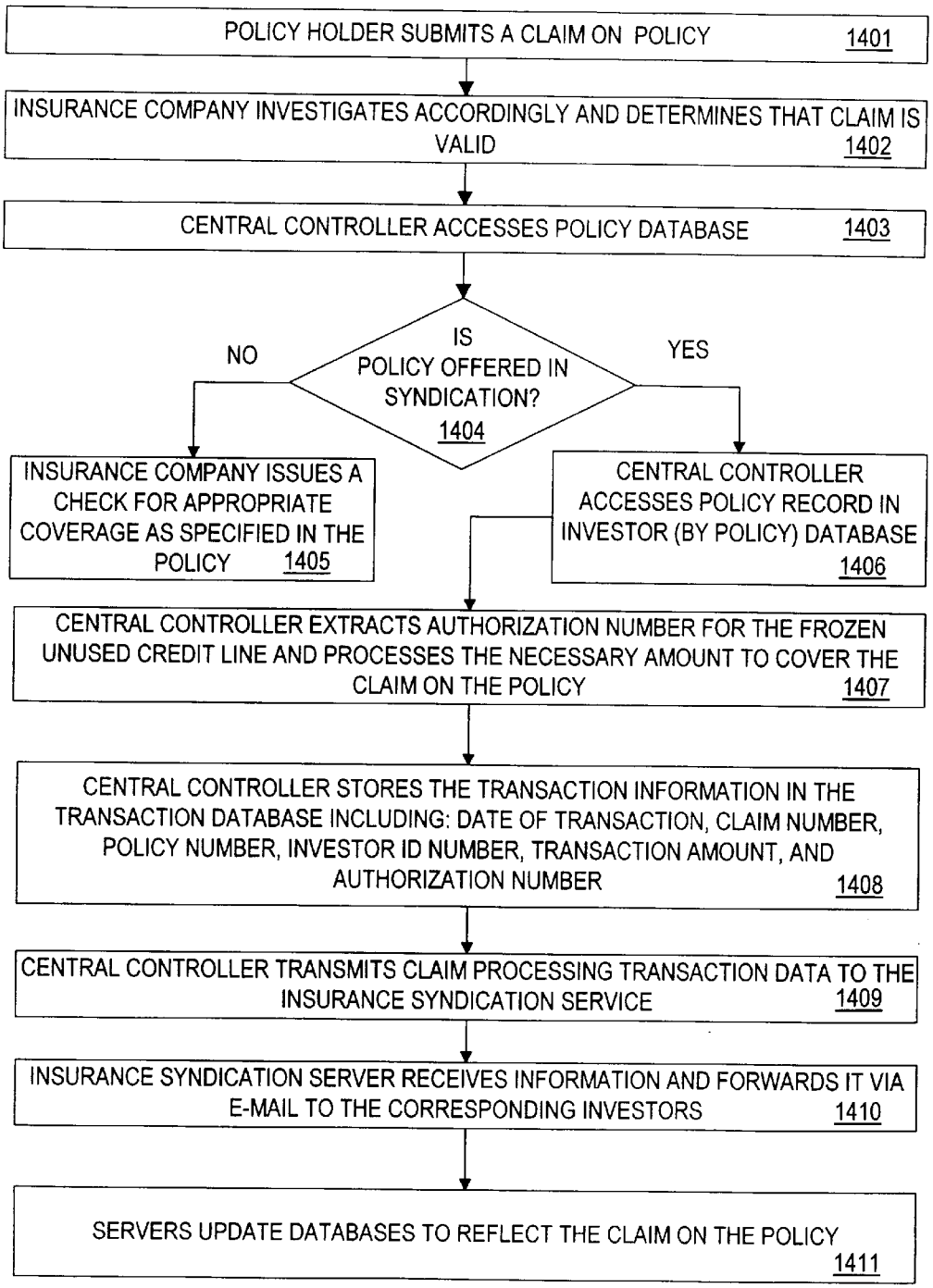
FIG. 14 is a flowchart describing the process by which the insurance company server processes a claim on a policy offered in syndication.

FIG. 14 shows the steps executed in processing a claim according to this embodiment of the invention. In step 1401, the policy holder submits a claim for an insurance payout against a policy. The insurance company investigates the claim and determines that the claim is valid (step 1402). The insurance company central controller 201 then accesses the policy database 320 (step 1403), to determine whether the policy is offered in syndication (step 1404). If not, the insurance company issues a check for appropriate coverage as specified in the policy (step 1405).

If the policy is syndicated, the insurance company central controller accesses the appropriate record or records in the investor (by policy) database 340 (step 1406). The insurance company central controller then extracts the authorization number for the frozen unused credit line from the transaction database 370. The insurance company central controller processes the claim with respect to each investor, charging each investor's credit account in accordance with the risk assumed by that investor to obtain the amount necessary to cover the claim (step 1407). The central controller stores the transaction information in the transaction database 370 (step 1408). The transaction information may include the transaction date, claim number, policy number, investor ID number, transaction amount, and authorization number.

The insurance company central controller transmits the claim processing transaction data to the insurance syndication central server 120 and the credit card issuing bank server 150 (step 1409). The syndication central server receives the claim transaction information and forwards it via e-mail to the corresponding investors (step 1410). Finally, each of the servers 110, 120 and 150 update their databases to reflect the claim on the policy and the resulting credit card account transaction (step 1411).

In the embodiment described above, a risk profile (rating and risk assessment) for each policy offered in syndication is determined by the underwriter's analysts, with a given monthly premium offered in exchange for a given amount of risk. Alternatively, the investors themselves could arrive at a rating for a policy, by offering bids (expressed in monthly premium amounts) against a given portion of risk.

The underwriter may recover the costs associated with operating a syndication system by either selling the premium revenue stream at a reduced fraction of the pro rata liability, or by requiring investors to accept slightly higher portions of the total risk than indicated by a pro rata allocation of the premium. For example, if on a one-year $ 50,000 term life insurance policy the agreed annual premium is $ 1,000, an investor purchasing a 10% stake in the policy would either receive $100 in premium in return for a $ 5,500 risk cost, or receive $ 90 in premium for a $ 5,000 risk cost.

In the embodiment described above, the investor provides security to cover the risk he assumes by permitting a freeze on his credit card account. This is the preferred embodiment as it utilizes available credit in lieu of real funds. Alternatively, the risk could be secured by a Treasury bill, a minimum balance in a checking or savings account, a minimum value of a securities portfolio, or any other financial instrument where the amount of assumed risk is secured by a minimum balance which is attachable by the insurer.

In the preferred embodiment, the user (investor) 141 communicates with the syndication service over the Internet 100 through a user interface 140. However, it will be appreciated that the user and syndication service may communicate in a variety of other ways, for example, over other wide area networks, over a closed network, by telephone or by mail.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

We claim:

1. An apparatus for facilitating a syndicated sale of an insurance policy, the apparatus comprising:
   a processing system including a processor;
   a data receiving device connected to the processing system for receiving data;
   a data storage device connected to the processing system for storing policy information relating to the insurance policy and a data structure that associates the policy information and buyers of shares in an underwriting of the insurance policy; and a data output device connected to the processing system for outputting data, wherein the processing system is operative to execute a program to direct the apparatus to receive policy information relating to the insurance policy, to transmit for electronic viewing by a potential buyer an invitation to offer to buy a share in an underwriting of the insurance policy, the invitation including at least a portion of the policy information, the share having associated therewith a risk cost assessable to a buyer of the share if a payment to an insured is made pursuant to the insurance policy, and to receive an offer to buy the share, the offer including information identifying collateral against which the risk cost may be charged if the payment to the insured pursuant to the insurance policy is made.

2. An apparatus according to claim 1, wherein the program is further adapted to cause the processor to transmit the invitation to offer to buy the share on an electronic network to a plurality of buyers.

3. An apparatus according to claim 1, wherein the program is adapted to accept the offer and the collateral so as to at least partially underwrite the insurance policy.

4. An apparatus according to claim 3, wherein the collateral is a credit account, and the program is further adapted to initiate an electronic communication with an issuer of the credit account to determine whether sufficient credit is available to cover the risk cost, and to electronically initiate a credit freeze with respect to the credit account, so as to secure a credit amount necessary to cover the risk cost.

5. An apparatus according to claim 4, wherein the program is further adapted to cause the processor to electronically receive notice if the credit account is closed or if the necessary credit amount is otherwise made unavailable, and to initiate rescission of the offer in response to such notice.

6. An apparatus according to claim 4, wherein the program is further adapted to initiate an electronic communication with the issuer of the credit account to make a charge against the credit account in accordance with the share if the payment to the insured pursuant to the insurance policy is made.

7. An apparatus according to claim 3, wherein the program is further adapted to cause the processor to provide information regarding the share and the buyer of the share, to facilitate payment of a portion of a premium associated with the insurance policy to the buyer of the share, the portion having a size in accordance with the share.

8. An apparatus according to claim 1, wherein the storage device stores information regarding the insurance policy, the offer to buy the share, the buyer of the share, the share and the risk cost associated therewith and the collateral.

9. An apparatus according to claim 1, wherein the processing system further includes a cryptoprocessor connected to the processor, and the cryptoprocessor encrypts electronic transmissions outputted from the apparatus through the output means and decrypts electronic transmissions received by the apparatus through the receiving means.

10. An apparatus according to claim 9, wherein the cryptoprocessor comprises a software engine executed by the processor.

11. An apparatus for facilitating a syndicated sale of an insurance policy, the apparatus comprising:

a processing system including a processor and a storage device connected to the processor;

a data receiving device connected to the processing system for receiving data; and a data output device connected to the processing system for outputting data, wherein the storage device contains a program, adapted to be executed by the processor, to direct the apparatus to receive policy information relating to the insurance policy, to transmit for electronic viewing by a potential buyer an invitation to offer to buy a share in an underwriting of the insurance policy, the invitation including at least a portion of the policy information, the share having associated therewith a risk cost assessable to a buyer of the share if a payment to an insured is made pursuant to the insurance policy, and to receive an offer to buy the share, the offer including information identifying collateral against which the risk cost may be charged if the payment to the insured pursuant to the insurance policy is made, wherein the program is adapted to accept the offer and the collateral so as to at least partially underwrite the insurance policy, wherein the collateral is a credit account, and the program is further adapted to initiate an electronic communication with an issuer of the credit account to determine whether sufficient credit is available to cover the risk cost, and to electronically initiate a credit freeze with respect to the credit account, so as to secure a credit amount necessary to cover the risk cost, and wherein the credit account is a credit card account and the credit freeze is a freeze against available credit.

12. An apparatus for facilitating a syndicated sale of an insurance policy, the apparatus comprising:

a processing system including a processor;

a data receiving device connected to the processing system for receiving data;

a data storage device connected to the processing system for storing policy information relating to the insurance policy and a data structure that associates the policy information and buyers of shares in an underwriting of the insurance policy; and a data output device connected to the processing system for outputting data, wherein the processing system is operative to execute a program to direct the apparatus to provide policy information regarding the insurance policy, to initiate a premium payment to a buyer of a share of the policy of a portion of a premium associated with the policy, the portion having a size in accordance with the share, and to initiate a communication to make a charge against a credit account of the buyer in accordance with the share if a claim payment to an insured pursuant to the insurance policy is made.

13. An apparatus for facilitating a syndicated sale of an insurance policy, the apparatus comprising:

a processing system including a processor and a storage device connected to the processor;

a data receiving device connected to the processing system for receiving data; and a data output device connected to the processing system for outputting data, wherein the storage device contains a program, adapted to be executed by the processor, to direct the apparatus to provide policy information regarding the insurance policy, to initiate a premium payment to a buyer of a share of the policy of a portion of a premium associated with the policy, the portion having a size in accordance with the share, and to initiate a communication to make a charge against a credit account of the buyer in accordance with the share if a claim payment to an insured pursuant to the insurance policy is made, and wherein the credit account is a credit card account, and the program is further adapted to direct the apparatus to initiate a freeze against available credit with respect to the credit card account in accordance with the share.

14. An apparatus for facilitating a syndicated sale of an insurance policy, the apparatus comprising:

a processing system including a processor and a storage device connected to the processor;

a data receiving device connected to the processing system for receiving data; and a data output device connected to the processing system for outputting data, wherein the storage device contains a program, adapted to be executed by the processor, to direct the apparatus to receive a query regarding an availability of credit of a credit account of a buyer of a share of the insurance policy sufficient to cover a risk cost associated with the share, to transmit a response to the query, to perform a credit freeze with respect to the credit account so as to secure a credit amount necessary to cover the risk cost, and to transmit a verification that the credit freeze has been performed, and wherein the credit account is a credit card account and the credit freeze is a freeze against available credit.

15. An automated computer-implemented method of syndicating underwriting of an insurance policy, comprising the steps of:

providing electronic data including information relating to the insurance policy;

receiving electronic data identifying a buyer of a share in the underwriting of the insurance policy, the received electronic data including an identifier of a credit card account against which a risk cost to the buyer can be collateralized, initiating an electronic communication with an issuer of the credit card account to determine whether sufficient credit is available to cover the risk cost; and electronically initiating a credit freeze with respect to the credit card account, so as to secure a credit amount necessary to cover the risk cost, wherein the credit freeze is a freeze against available credit.

16. A computer readable medium in which is stored computer readable code to be executed by a computer, the computer readable code performing a method of syndicating underwriting of an insurance policy, the method comprising the steps of:

receiving policy information regarding the insurance policy;

storing the policy information on a data storage device;

transmitting an invitation for electronic viewing by a potential buyer to offer to buy a share in an underwriting of the insurance policy, the invitation including at least a portion of the policy information, the share having associated therewith a risk cost assessable to a buyer if a payment to an insured is made pursuant to the insurance policy;

receiving an offer to buy the share, the offer including information identifying a buyer and collateral against which the risk cost may be charged if the payment to the insured pursuant to the insurance policy is made, the collateral being a line of credit on a credit account;

storing data on the data storage device that associates the policy information and the buyer;

initiating a communication to determine an availability of credit sufficient to cover the risk cost;

requesting a credit freeze with respect to the credit account so as to secure a credit amount necessary to cover the risk cost; and transmitting to the buyer an indication of acceptance of the offer and the collateral.

17. A system for facilitating a syndicated sale of an insurance policy, comprising:

a first processing system including a first processor, a first communication device connected to the first processor for performing Internet communications, and a first storage device connected to the first processor, the first storage device containing a first program, adapted to be executed by the first processor, for receiving on the Internet policy information regarding the insurance policy, transmitting on the Internet an invitation for electronic viewing by a potential buyer to offer to buy a share in an underwriting of the insurance policy, the invitation including at least a portion of the policy information, the share having associated therewith a risk cost assessable to a buyer if a payment to an insured is made pursuant to the insurance policy, receiving on the Internet an offer to buy the share, the offer including information identifying collateral against which the risk cost may be charged if the payment to the insured pursuant to the insurance policy is made, the collateral being a line of credit on a credit account, initiating a communication to determine an availability of credit sufficient to cover the risk cost, requesting a credit freeze with respect to the credit account so as to secure a credit amount necessary to cover the risk cost, and transmitting on the Internet to the buyer an indication of acceptance of the offer and the collateral;

a second processing system including a second processor, a second communication device connected to the second processor for performing Internet communications, and a second storage device connected to the second processor, the second storage device containing a second program, adapted to be executed by the second processor, for providing the policy information on the Internet, initiating payment of a portion of a premium associated with the insurance policy to the buyer, the portion having a size in accordance with the share, and initiating a communication to make a charge against the credit account in accordance with the share if the payment to the insured pursuant to the insurance policy is made; and a third processing system including a third processor, a third communication device connected to the third processor for performing communications, and a third storage device connected to the third processor, the third storage device containing a third program, adapted to be executed by the third processor, for responding to the communication from said first processing system to determine the availability of credit sufficient to cover the risk cost, performing the credit freeze with respect to the credit account, transmitting to said first processing system a verification of the credit freeze, and making the charge against the credit account in response to the communication from said second processing system.

18. A method of syndicating underwriting of an insurance policy by using Internet communications, the method comprising the steps of:

providing policy information on the Internet regarding the insurance policy;

transmitting on the Internet an invitation for electronic viewing by a potential buyer to offer to buy a share in an underwriting of the insurance policy, the invitation including at least a portion of the policy information, the share having associated therewith a risk cost assessable to a buyer if a payment to an insured is made pursuant to the insurance policy;

receiving on the Internet an offer to buy the share, the offer including information identifying collateral against which the risk cost may be charged if the payment to the insured pursuant to the insurance policy is made, the collateral being a line of credit on a credit account;

determining an availability of credit sufficient to cover the risk cost;

initiating a credit freeze with respect to the credit account so as to secure a credit amount necessary to cover the risk cost; and transmitting on the Internet to the buyer an indication of acceptance of the offer and the collateral;

initiating payment of a portion of a premium associated with the insurance policy to the buyer, the portion having a size in accordance with the share; and charging against the credit card account in accordance with the share if a claim payment to an insured pursuant to the insurance policy is made.

\* \* \* \* \*